(12) United States Patent
Farmanbar

(10) Patent No.: US 10,897,419 B2
(45) Date of Patent: Jan. 19, 2021

(54) METHOD AND APPARATUS FOR SUPPORTING SERVICE FUNCTION CHAINING IN A COMMUNICATION NETWORK

(71) Applicant: Hamidreza Farmanbar, Ottawa (CA)

(72) Inventor: Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/799,347

(22) Filed: Oct. 31, 2017

(65) Prior Publication Data

US 2018/0054384 A1 Feb. 22, 2018

Related U.S. Application Data

(63) Continuation of application No. 14/870,649, filed on Sep. 30, 2015, now abandoned.

(51) Int. Cl.
*H04L 12/721* (2013.01)
*H04L 12/741* (2013.01)
*H04L 12/725* (2013.01)
*H04L 12/911* (2013.01)
*H04L 12/801* (2013.01)

(52) U.S. Cl.
CPC ............ *H04L 45/38* (2013.01); *H04L 45/306* (2013.01); *H04L 45/74* (2013.01); *H04L 47/822* (2013.01); *H04L 47/29* (2013.01)

(58) Field of Classification Search
None
See application file for complete search history.

(56) References Cited

U.S. PATENT DOCUMENTS

| 2015/0163150 A1 | 6/2015 | Beheshti-Zavareh et al. |
| 2015/0195197 A1* | 7/2015 | Yong ...................... H04L 45/74 370/392 |
| 2015/0215172 A1 | 7/2015 | Kumar |

(Continued)

FOREIGN PATENT DOCUMENTS

| CA | 2607338 A1 | 11/2006 |
| CN | 101150517 A | 3/2008 |

(Continued)

OTHER PUBLICATIONS

International Search Report for International Application No. PCT/CA2016/100636 dated Nov. 25, 2015.

(Continued)

*Primary Examiner* — Kodzovi Acolatse

(57) ABSTRACT

A method and apparatus supporting service function chaining in a communication network is provided. Service function chaining requires packets of a service to pass through a defined sequence of service nodes of the network. Traffic engineering support includes defining service segments, determining demands for each service segment, determining flow group conservation constraints using the determined demands, and determining a resource allocation for data links which respects the flow group conservation constraints along with a link capacity constraint. A service-based forwarding operation re-labels packets as they traverse each service segment, and forwards packets toward a destination service node of each service segment.

19 Claims, 11 Drawing Sheets

(56) References Cited

U.S. PATENT DOCUMENTS

| | | | |
|---|---|---|---|
| 2015/0236948 A1 | 8/2015 | Dunbar et al. | |
| 2015/0281087 A1* | 10/2015 | Jalan | H04L 47/125 |
| | | | 370/235 |
| 2015/0326473 A1 | 11/2015 | Dunbar | |
| 2015/0334094 A1 | 11/2015 | Suresh | |
| 2015/0381493 A1* | 12/2015 | Bansal | H04L 45/30 |
| | | | 370/392 |
| 2016/0157043 A1* | 6/2016 | Li | H04W 4/70 |
| | | | 370/254 |
| 2016/0165014 A1 | 6/2016 | Nainar | |
| 2016/0165454 A1* | 6/2016 | Li | H04W 88/16 |
| | | | 370/254 |
| 2016/0248859 A1 | 8/2016 | Jacquenet | |
| 2016/0261495 A1* | 9/2016 | Xia | H04L 45/58 |
| 2016/0344803 A1 | 11/2016 | Batz | |

FOREIGN PATENT DOCUMENTS

| | | |
|---|---|---|
| CN | 104717238 A | 6/2015 |
| EP | 1720297 A1 | 11/2006 |

OTHER PUBLICATIONS

Abrahamsson, H. et al., "A multi-path routing algorithm for IP networks based on flow optimization," International Workshop on Quality of Future Internet Services, Zurich, Oct. 2002.
ETSI GS NFV-SWA 001 V1.1.1 (Dec. 2014), Network Functions Virtualisation (NFV); Virtual Network Functions Architecture, Dec. 2014.

* cited by examiner

905 Identify Service Segments

910 Identify Service Function Chains (SFCs) of All Services

915 Form Graph Data Structure According to SFCs

920 Identify Service Segments as Collections of Nodes in Graph Data Structure, including segment-specific source nodes and segment-specific destination nodes (To FIG. 9B)

FIG. 9A

930 Determine Demands of Service Segments

935 For Each Node $n$ of Graph Data Structure and associated segment $k$: Determine Segment-Specific Demand $d^k(n)$

940 For Each Service Segment $k$ and Each Node $n$, Set Flow Group Conservation Constraint as:

$$\sum x_{e}^{k} - \sum x_{e}^{k} = \begin{cases} 0, & n \in S^k, n \neq q^k \\ \sum d^k(m), & n \in \bar{S}^k \\ \sum d^k(m), & n = q^k \end{cases}$$

960 Determine Feasible/Optimal Traffic Allocation subject to:
Conservation Constraints;
Link Capacity Constraints $$\max_{x} U(x)$$

Subject to:

$$\sum_{a \mid i_{a2}(n)} x_a^k - \sum_{a \mid i_{a1}(n)} x_a^k = \begin{cases} 0, & n \notin S^k, n \neq q^k \\ -d^k(n), & n \in S^k \\ \sum_{n \in S^k} d^k(n), & n = q^k \end{cases}$$

$$\sum_{k=1}^{K} x_a^k \leq c_a$$

FIG. 9C

METHOD AND APPARATUS FOR SUPPORTING SERVICE FUNCTION CHAINING IN A COMMUNICATION NETWORK

CROSS REFERENCE TO RELATED APPLICATIONS

This application is a continuation of U.S. patent application Ser. No. 14/870,649 filed on Sep. 30, 2015 and entitled Method and Apparatus for Supporting Service Function Chaining in a Communication Network, the contents of which are incorporated by reference.

FIELD OF THE INVENTION

The present invention pertains to the field of data communications and in particular to a method and apparatus for supporting service function chaining in a communication network.

BACKGROUND

Service function chaining is a technique in which a data traffic flow is steered through an ordered series of service functions. Typically, each service function is located at a logical location in the network topology. Each service function may be responsible for specific treatment of received packets. As such, the service function chain allows for packets in a packet flow to undergo a sequence of packet treatments.

However, accommodating service function chaining imposes additional requirements and constraints on network management operations. For example, traffic engineering, flow control, routing and packet forwarding computations may require adjustment so that defined service function chains are respected while data flows are optimized. The distributed nature of service function chains across multiple nodes makes this a non-trivial issue.

Therefore there is a need for a method and apparatus for supporting service function chaining in a communication network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for supporting service function chaining in a communication network. In accordance with embodiments of the present invention, there is provided a method for supporting service-based packet communication in a multi-hop data network, comprising: receiving an indication of a set of services, each service of the set of services corresponding to a respective node group comprising: one or more source nodes providing packets belonging to the service; a destination node receiving the packets belonging to the service; and a set of service nodes through which the packets belonging to the service are required to pass, each service utilizing a respective set of service links connecting predetermined pairs of members of the respective node group; for each service node and each destination node belonging to at least one node group, determining a respective service segment corresponding to members of the sets of service links which connect to said service node or destination node and which are indicative of data flow into said service node or destination node for at least one of the set of services; for each service segment, and for each node in the node groups, determining a demand indicative of combined demand of source nodes belonging to services, of the set of services, for which service packets pass through said service segment; for each service segment, and for each of a plurality of nodes of the data network, including nodes of the node groups, determining a flow group conservation constraint indicative that an amount of resource allocation for data links incoming to the node and for the service segment: is less than an amount of resource allocation for data links outgoing from the node and for the service segment by a first margin equal to the determined demand indicative of combined demand for the node, when the node is a source node or a service node providing service packets to the service segment; is greater than the amount of resource allocation for data links outgoing from the node and for the service segment by a second margin equal to a sum of determined demands indicative of combined demands, the sum being over source nodes or service nodes providing service packets to the service segment, when the node is a service node or a destination node receiving service packets from the service segment; and is similar to the amount of resource allocation for data links outgoing from the node and for the service segment otherwise; for each of a plurality of data links operatively coupling nodes of the data network, the data links including the service links, determining a respective link capacity constraint; determining a resource allocation respecting the flow group conservation constraints and the link capacity constraints; and controlling operation of the data network in accordance with the determined resource allocation.

In accordance with embodiments of the present invention, there is provided a traffic engineering controller for a multi-hop data network, comprising: an input network interface configured to receive an indication of a set of services, each service of the set of services corresponding to a respective node group comprising: one or more source nodes providing packets belonging to the service; a destination node receiving the packets belonging to the service; and a set of service nodes through which the packets belonging to the service are required to pass, each service utilizing a respective set of service links pairwise connecting predetermined pairs of members of the respective node group; a processor configured to: for each service node and each destination node belonging to at least one node group, determine a respective service segment corresponding to members of the sets of service links which connect to said service node or destination node and which are indicative of data flow into said service node or destination node for at least one of the set of services; for each service segment, and for each node the node groups, determine a demand indicative of combined demand of source nodes belonging to services, of the set of services, for which service packets pass through said service segment; for each service segment, and for each of a plurality of nodes of the data network, including nodes of the node groups, determine a flow group conservation constraint indicative that an amount of resource allocation for data links incoming to the node and for the service segment: is less than an amount of resource allocation for data links outgoing from the node and for the service segment by a first margin equal to the determined demand indicative of combined demand for the node, when the node is a source node or a service node providing service packets to the service segment; is greater than the amount of resource allocation for data links outgoing from the node and for the service segment by a second margin equal to a sum of determined demands indicative of combined demands, the sum being over source nodes or service nodes providing service packets to the service segment, when the node is a service node or a destination node receiving service packets from the service segment; and is similar to the amount of resource allocation for data links outgoing from the node and for the service segment otherwise; for each of a plurality of data links operatively coupling nodes of the data network, the data links including the service links, determine a respective link capacity constraint; and determine a resource allocation respecting the flow group conservation constraints and the link capacity constraints; and an output network interface configured to transmit signals for controlling operation of the data network in accordance with the determined resource allocation.

In accordance with embodiments of the present invention, there is provided a router for routing a packet in a multi-hop data network, the packet belonging to a service, the service corresponding to a set of service nodes through which the packet is required to pass, the router communicatively coupled to one of the set of service nodes and comprising a data packet handling interface configured to: receive the packet and process a label, carried by the packet, comprising an indication of a first service segment traversed by the data packet; adjust the label to include an indication of a second service segment to be traversed by the packet upon transmission of the packet from the router; and transmit the packet toward a further service node of the set of service nodes based on the indication of the second service segment.

In accordance with embodiments of the present invention, there is provided a method for supporting service-based packet communication in a multi-hop data network, comprising: providing an indication of a plurality of service segments, each service segment corresponding to a set of service links via which data flows into a service node or destination node, said data corresponding to a service requiring the data to pass through a specified sequence of service nodes; determining a plurality of demand values corresponding respectively to the plurality of service segments, each demand value indicative of a combined demand of source nodes belonging to services for which service packets pass through the respective service segment; and performing a traffic engineering optimization calculation with all service segments present and in consideration of the determined plurality of demand values.

In accordance with embodiments of the present invention, there is provided a plurality of routers for routing a packet in a multi-hop data network, the packet belonging to a service, the service corresponding to a set of service nodes through which the packet is required to pass, the plurality of routers collectively configured to: label the packet with an indication of a first service segment prior to transmission of the packet from a first service node of the set of service nodes onto a data link corresponding to the first service segment; forward the packet toward a second service node of the set of service nodes based on the indication of the first service segment; and upon receipt of the packet at the second service node, re-label the packet with an indication of a second service segment to be subsequently traversed by the packet.

BRIEF DESCRIPTION OF THE FIGURES

Further features and advantages of the present invention will become apparent from the following detailed description, taken in combination with the appended drawings, in which:

FIGS. 9A to 9C illustrate a sequence of operations being performed in accordance with embodiments of the present invention.

It will be noted that throughout the appended drawings, like features are identified by like reference numerals.

DETAILED DESCRIPTION

Embodiments of the present invention are directed toward the support of service function chaining, in a network using traffic engineering, traffic forwarding, or both. Embodiments of the present invention may be used to steer service traffic flows from their source nodes to their destination nodes, through a predetermined sequence of intermediate service nodes, and in a manner that achieves predetermined network objectives. Network objectives may include load balancing, sum rate maximization, and weighted sum rate maximization, for example. As such, embodiments of the present invention relate to traffic engineering under the additional constraint that packets of packet flows associated with given services are required to pass through specified sequences of service nodes. In some embodiments, a packet forwarding mechanism for implementation in the data plane may also be provided. In the packet forwarding mechanism, packets are labelled with destination information designating the next service node in the service function chain to be visited. As each service node is reached, the packets can be re-labeled.

Service-based traffic engineering in embodiments of the invention may involve three steps. In the first step, service segments are introduced. In the second step, demand values of the service segments may be determined. In the third step, a traffic engineering optimization calculation, for example comparable to a destination-based traffic engineering calculation, is performed with all service segments present and in consideration of the determined demand values. Traffic engineering may thus be performed based on services rather than on flows. The details of these steps will be described below.

Figure 1:
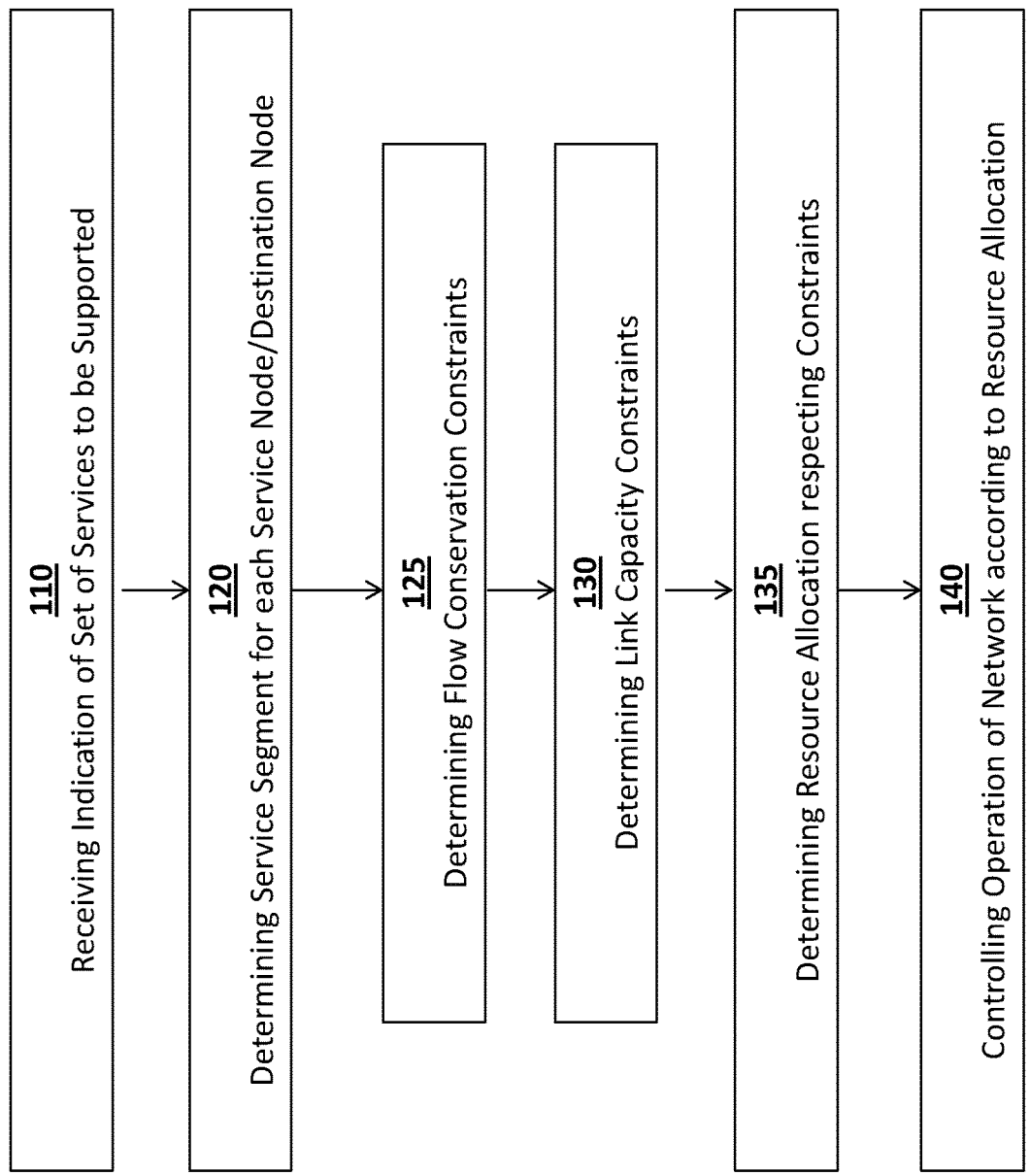
FIG. 1 illustrates a method for service-based traffic engineering, in accordance with embodiments of the present invention.

Having reference to FIG. 1, embodiments of the present invention provide for a method for supporting service-based packet communication in a multi-hop data network. The method includes receiving 110 an indication of a set of services to be supported by the data network. Each service corresponds to a respective node group as well as a respective set of service links. Each node group includes one or more source nodes which provide data packets in accordance with and belonging to the service. Each node group further includes a destination node which receives the packets belonging to the service. Each node group further includes a set of service nodes through which the packets belonging to the service are required to pass. The set of service nodes corresponds to a Service Function Chain (SFC). In some embodiments, the destination node can be set equal to the last service node in the SFC. The service links connect certain pairs of members of the corresponding node group and may indicate directional data flow between those members. For example, each service link may be a logical link from one member of the node group to another. Service links may pass through intermediate nodes (such as routers) and data links; however these intermediate nodes may be abstracted from the definition of the service link. Service links may indicate the direction of data flow from flow source nodes of a service, through intermediate service nodes to the destination node.

In more detail, and in various embodiments, a service may be defined as a group of flows that are required to pass through a certain sequence of service functions. A flow is identified by its source and destination nodes. A flow within a service passes through a predetermined sequence of associated service functions before reaching its destination node. Service functions may be specific to the associated service. Some service functions may be more generic and applicable to more than one service. The service functions can be instantiated at certain network nodes, and flows can pass through their corresponding predetermined service function nodes. In various embodiments, a service corresponds to a set of source nodes, which can be source nodes of the flows within the service, and a sequence of service function nodes including the destination node.

The method further includes determining 120 a service segment for each service node and destination node belonging to at least one of the node groups. In some embodiments, each service segment corresponds to those members of all sets of service links (i.e. members of the union of all sets of service links) which connect to a given common service node or destination node, and which are indicative of data flow into that service node or destination node, for at least one of the set of services. In other words, at least one service segment may be defined on the basis of each service node or destination node, the service segment including the service links which are incoming to that service node or destination node as well as the source nodes and/or service nodes which are directly coupled to these service links.

In some embodiments, the service segments can be defined differently yet similarly to the above. In particular, when service-based forwarding based on service segment identifiers (in a manner to be described below) is implemented, service segments as defined above may be subdivided into multiple service segments (also referred to as sub-segments). The subdivision is performed in a manner that allows services nodes to determine which service a packet belongs to based solely on a service segment identifier carried by the packet.

Each service node and each destination node may potentially receive data in association with multiple services, and a service segment may include incoming service links for all of these multiple services. While a service segment is described above as corresponding to a set of service links, this correspondence can be formulated in a variety of alternative ways. For example, rather than specifying the associated service links, a service segment can be described by specifying the nodes (belonging to at least one node group) which act as endpoints for those associated service links. In some embodiments, service segments can be determined through creation and processing of a graph data structure which represents the set of services.

The method further includes, for each node of the data network and for each service segment, determining 125 a flow group conservation constraint. The nodes of the data network include but are not limited to the nodes of the various node groups described above. For example, the nodes may include intermediate nodes, such as routers, which lie or potentially lie along a service link. The flow group conservation constraints specify how data is introduced at sources, flows through intermediate nodes, and reaches intended destinations. The "flow group" to which the flow group conservation constraint can pertain to a flow segment group or a service segment, as described elsewhere herein.

A flow or service can be subdivided into a series of flow segments. For example, where the flow or service begins at source node A, passes sequentially through service nodes $S_i$ (for i=1, 2, . . . n) and terminates at destination node Q, then the flow segments correspond to $(A, S_1)$, $(S_i, S_{i+1})$ for i=1, 2, . . . n and $(S_n, Q)$.

The method further includes, for a set of data links of the network, including physical links which support logical service links, determining 130 a set of associated link capacity constraints, which provide limits on the amount of bandwidth to be supported by the various data links in the set. The limits may based on the physically available bandwidth of the data links, or based on a nominal portion of the bandwidth allocated for handling by the traffic engineering method or apparatus as described herein.

The method further includes determining 135 a resource allocation respecting the flow group conservation constraints and the link capacity constraints. The resource allocation may also maximize a given objective function, and hence may be the solution to a constrained optimization problem. In some embodiments, the method further includes defining an objective function to be maximized, prior to determining the resource allocation. The objective function may be predetermined or given by an external network management entity, for example, and may reflect one or more network objectives to be achieved. The objective function may be static or dynamic.

The resource allocation may specify, for a given link, a proportion of data resources of the link which are to be used in support of a service traversing the link. The resource allocation may relate to an assigned data rate, bandwidth reservation, or the like, for each data link. For example, a resource allocation may specify a nominal maximum, minimum and/or average data rate for a given service on a given service link. The method further includes controlling 140 operation of the data network in accordance with the determined resource allocation, for example including routing and/or forwarding packets according to the allocation. Controlling operation of the data network may include providing instructions to various routers, source nodes, service nodes, and other infrastructure components, the instructions directing one or more operations of these components.

Figure 2:
FIG. 2 illustrates a method for service-based packet forwarding, in accordance with embodiments of the present invention.

According to some embodiments, routing packets includes forwarding packets between network nodes using a combination of destination-based forwarding and packet re-labeling. As illustrated in FIG. 2, a particular method of routing packets includes, prior to transmission of the packet from a source node onto a data link corresponding to a first service segment, labeling 210 the packet with an indication of the first service segment. The method further comprises routing 215 the packet based on the indication of the first service segment. The routing is configured to forward the packet toward a second service node, using destination-based routing which identifies the second service node as the packet destination based on the indication of the first service segment carried by the packet. The routing may include receiving the packet at intermediate non-service nodes (i.e. network nodes other than and situated between service nodes) and forwarding the packet onward toward the second service node. These non-service nodes do not adjust the service segment label in the illustrated embodiment. The method further includes, upon receipt of the packet at the second service node, re-labeling 220 the packet with an indication of a second service segment to be subsequently traversed by the packet. Re-labeling is performed at service nodes, but typically not performed at nodes other than service nodes. Packet labeling may include configuring a field in the packet header, for example. Multiple instances of packet re-labeling may occur at successive service nodes. Routing of packets carrying a service segment identifier includes determining a service node or destination node, associated with the service segment and toward which the packets are to be forwarded, and forwarding the packets accordingly.

According to embodiments of the present invention, services to be supported may be specified in advance, for example by various network elements such as servers and client devices, and an indication of a set of services to be supported can be received and processed. Each service of the set of services is defined in part by a Service Function Chain (SFC), which describes the set of service nodes through which packets belonging to the service are required to pass. The service nodes are distributed through the communication network, typically interspersed with other devices such as routers, which may correspond to non-service nodes. The service nodes may further implement a routing function as well as a service function which forms part of the SFC. Source nodes and destination nodes may also form part of a service definition, as well as a set of service links connecting the various nodes and specifying the flow of data from the source nodes to the destination nodes. The set of service links may be implicitly defined by the ordering of the service nodes.

In the present disclosure, a SFC can be defined using arrow notation, such as X→Y→Z, specifying that packets are required to pass in order through nodes X, Y and Z.

In various embodiments, the communication network can be characterized as a graph G(N,A) having a set of nodes N and a set of edges A. A set of service nodes $N_S$, which is a subset of all nodes N of graph G, can be defined. The set of service nodes $N_S$ corresponds to all those nodes which are specified as service nodes in SFCs of the services to be supported. Sets of source nodes and destination nodes can similarly be defined as a function of all services being supported.

The term "service" refers to a group of flows which are to pass through a common sequence of service nodes. A flow may be identified by a pair of nodes corresponding to a data source and a data destination, respectively, in accordance with conventions such as used in the Multi-Commodity Flow (MCF) flow problem, as would be readily understood by a person skilled in the art. A flow group may correspond, for example, to a set of flows with a common destination. The sequence of service nodes corresponds to the Service Function Chain for that service. In various embodiments, the service may also be restricted to a group of flows having common characteristics, such as Quality of Service (QoS) requirements. In various embodiments, a service may be identified by a set of source nodes and an ordered sequence of service nodes. The sequence of service nodes corresponds to the SFC.

In embodiments, services can be defined, and flows can be aggregated, in various ways. In some cases, a service or flow group can consist of a single flow. In some cases, the number of flows in a service or flow group can be selectable and/or variable. Different services or flow groups may include different numbers of flows. In some embodiments, flows may be allocated to a service based at least partially on traffic engineering considerations.

A service can be defined as a pair (A, X→Y→Z), where A is the set of source nodes of the service and X→Y→Z is the SFC for the service. Where the set A is known and there is no risk of confusion, it may be omitted from the definition.

Examples of services include services related to Machine Type Communication (MTC) and Mobile Broadband (MBB). A flow within an MTC service may pass through a serving gateway node in order for certain service functions to be applied on packets at a first service node. The flow may then pass through a packet gateway, considered as second service node.

Figure 3:
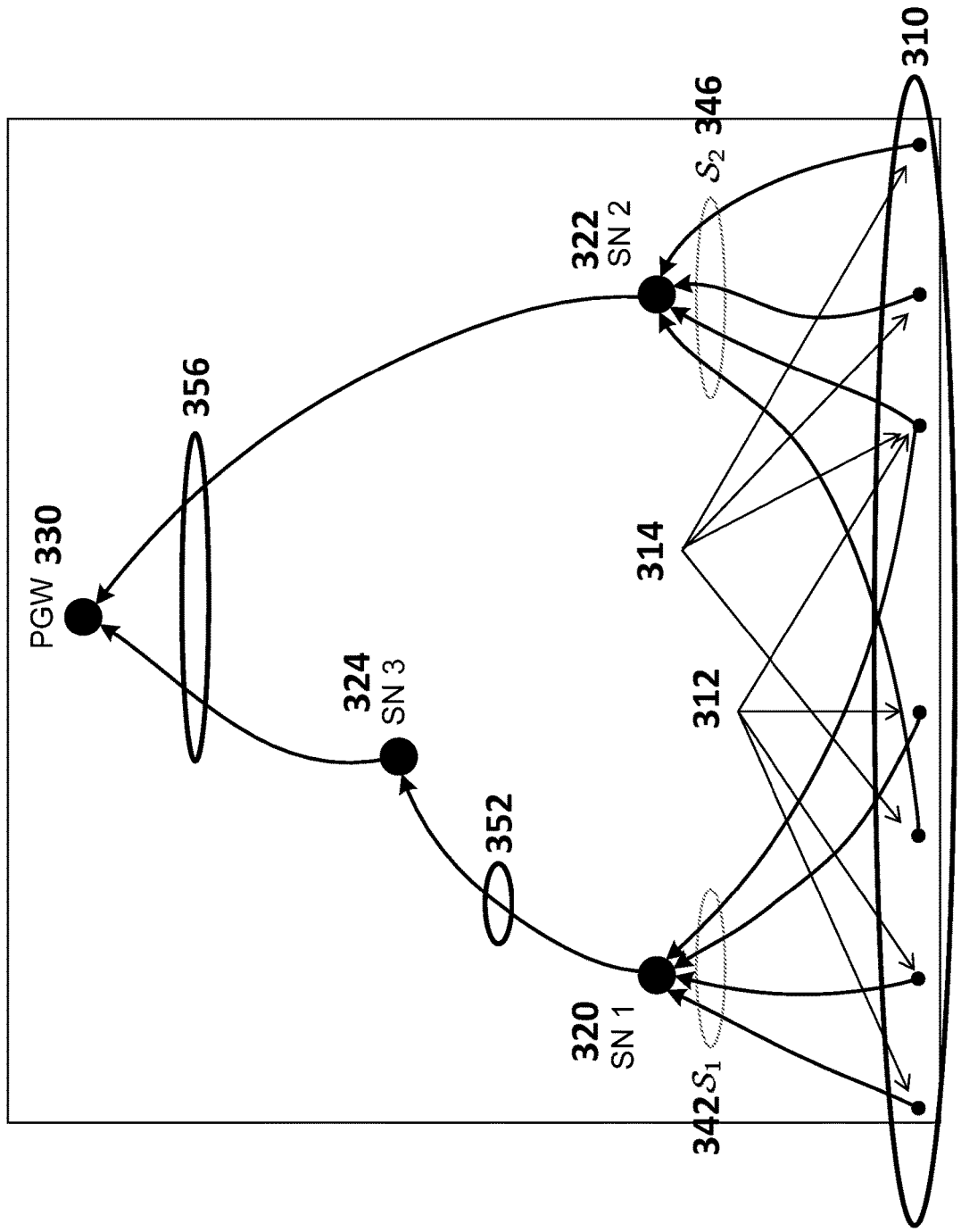
FIG. 3 illustrates an example network configuration in accordance with an embodiment of the present invention.

FIG. 3 illustrates an example network having two services, according to an embodiment of the present invention. The network includes a set of source nodes 310, first, second and third service nodes 320, 322, 324, and a Packet Gateway (PGW) service node 330. The first service, $S_1$, forwards packets from source nodes in a first subset 312 of the source nodes 310 through the first and third service nodes 320, 324 to the PGW node 330. The second service, $S_2$, forwards packets from source nodes in a second subset 314 of the source nodes 310 through the second service node 322 to the PGW node 330.

In some embodiments, the SFC may indicate a full or partial order in which the service nodes are to handle packets belonging to the service. For example, the SFC may specify that a first service node is to handle packets prior to a second service node handling the packets. In other embodiments, the order in which service nodes are to handle packets is unspecified. This may be the case when the order of service node visitation is not important to the service.

Embodiments of the present invention include identifying a set of service segments. As noted above, each service segment can correspond to those service links which directly connect to a given service node or to a given destination node and which are indicative of data flow into that service node or destination node for at least one service. All services in a given set of services to be supported, and all service links corresponding to those services, are considered when identifying a service segment.

In embodiments of the present invention, when the SFCs of two different services have a common service node, and the portion of the two SFCs that is subsequent to the common service node are different, then the definition of one or more service segments is adjusted. The adjustment is performed in such a manner that packets belonging to the two different services retain different labels so that they can subsequently be routed through the two different SFCs based on labels. The adjustment may include splitting a service segment into multiple segments (sub-segments). The adjustment may include defining two different service segments corresponding to two different sets of service links which feed directly or indirectly to the common service node and which are indicative of data flow into or toward that service node for at least one service.

For example, in some embodiments, a service segment as defined above may be separated into multiple sub-segments whenever such multiple sub-segments are required to resolve a routing ambiguity. The routing ambiguity may correspond to a situation in which packets of different services traverse the same service segment, but subsequently are required to traverse different service segments. Separating the segment into sub-segments is configured to avoid the routing ambiguity. The sub-segments can overlap. For example, the sub-segments share a common service node or destination node to which service links of the sub-segments lead. In some cases, the service nodes and service links of two sub-segments can be identical.

The reason for such an adjustment is to avoid aggregating all service links in one service segment. This avoids having all packets in a service segment being given the same label, which would inhibit the ability of the common service node, or other subsequent service nodes, from appropriately re-labeling packets so that they go through their requisite planned sequence of service nodes, in the case that packet re-labeling is based solely on service segment identifiers carried by the packets.

In some embodiments, the adjustment to service segments may be performed to facilitate traffic forwarding as described herein, but may not necessarily be performed to facilitate traffic engineering.

Alternatively, instead of adjusting service segment definitions as above, traffic forwarding can be based in part on a service identifier carried by the packets, rather than based solely on the current service segment identifier carried by the packets.

Referring again to FIG. 3, four service segments are identified. The first service segment 342 comprises network paths leading from the first subset 312 of source nodes to the first service node 320. The second service segment 346 comprises network paths leading from the second subset 314 of source nodes to the second service node 324. The third service segment 352 comprises network paths leading from the first service node 320 to the third service node 324. The fourth service segment 356 comprises network paths leading from the second and third service nodes 322, 324 to the PGW node 330.

As an alternative, substantially equivalent definition, a service segment can be defined by those nodes, belonging to the union of all node groups, which are directly connected at the endpoints of the service links corresponding to the service segment as defined above. The service segment definition may also include a specification of the logical interconnections between nodes. Referring to FIG. 3, the first service segment 342 thus comprises the first subset 312 of source nodes and the first service node 320. The second service segment 346 comprises the second subset 314 of source nodes and the second service node 324. The third service segment 352 comprises the first service node 320 and the third service node 324. The fourth service segment 356 comprises the second and third service nodes 322, 324 and the PGW node 330.

It should be noted that, while FIG. 3 illustrates service links as simple curves joining source nodes, service nodes and destination nodes, each service link may include other components, such as non-service nodes indicative of routers or other network equipment, multiple network path branches which lead to nodes operating in a series and/or parallel configuration, and the like. The service links mask and abstract these other network elements. A service link may correspond to a potentially complex network of routing nodes, which may forward service packets toward the next service node.

The service nodes correspond to intermediate destinations for data carried by service segments. Further, the number of service segments may be at least equal to the total number of service nodes. Since the service nodes are treated as local destinations on service segments, concepts from destination-based traffic engineering and destination-based routing may be employed. For example, given a group of flows, individual flows within the group which have the same destination may be treated substantially identically, with substantially no need to distinguish between such same-destination flows. In contrast to destination-based traffic engineering, service-based traffic engineering as employed herein accommodates the requirement of service function chaining for individual services. Traffic engineering uses information about the traffic entering and leaving the network to generate a routing scheme that optimizes network performance.

In some embodiments, a graph data structure can be defined and used to identify the set of service segments. The graph data structure encodes all services of the set of services being supported. In particular, the graph data structure indicates a set of vertices interconnected by a set of edges. Each member of the set of vertices represents a member of a node group of at least one service (that is, a service node, source node, or destination node). Each node is represented in the graph once, even when it is used by more than one service. Each member of the set of edges represents existence of a service link between a pair of the nodes represented by a corresponding pair of the vertices. More particularly, an edge of the graph data structure is provided between a first node and a second node of the graph data structure, if and only if there is at least one SFC which specifies that packets according to the service are to pass from the first service node to the second service node directly and with no intervening service nodes. In the graph data structure, nodes of the node groups are included as vertices whereas nodes which do not belong to the node groups (such as routers interior to a service link) are not included as explicit vertices.

In various embodiments, a service segment is represented by a set of directed edges of the graph data structure, namely edges that are directed to a common vertex (e.g. a vertex representing a service node). The service segment may further be defined to include those vertices of the graph data structure which the set of directed edges are directed from. That is, the directed edges plus the vertices coupled to the directed edges at either end may constitute the service segment. The service segment excludes portions of the graph data structure which are not immediately connected to the set of directed edges described above.

In embodiments of the present invention, and with reference to the graph data structure defined above, each service segment belonging to the set of service segments can be identified as a subset of the set of edges (also of the graph data structure), that terminate at a common respective member of the set of vertices. Alternatively, a service segment can be identified by the set of vertices connected by this subset of edges.

By way of example, a scenario supporting five services $S_i$, i=1 to 5, is considered. With $R_i$, i=1 to 5, representing overlapping or non-overlapping sets of source nodes, and A through H representing service nodes, the services are defined as:

$S_1$: ($R_1$, A→B→C)
$S_2$: ($R_2$, D→B→C)
$S_3$: ($R_3$, E→C)
$S_4$: ($R_4$, F→G→H)
$S_5$: ($R_5$, I→G→H)

Figure 4:
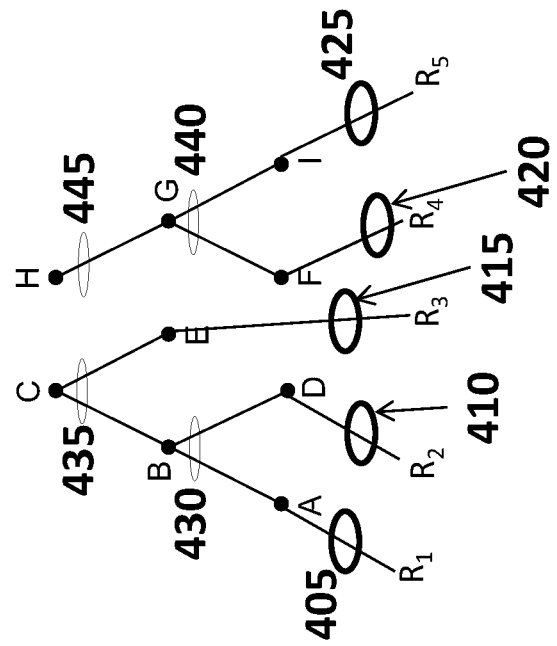
FIG. 4 illustrates an example graph data structure in accordance with an embodiment of the present invention.
Figure 4:
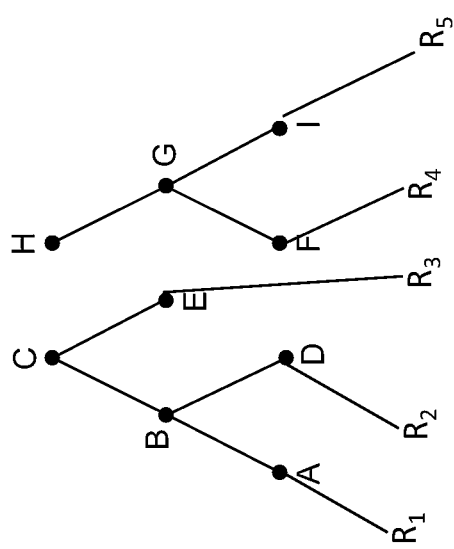

FIG. 4 illustrates a graph data structure according to $S_i$, i=1 to 5. Vertices are provided for all service nodes A through H and connected by edges corresponding to the service links. Some service nodes, such as B, C and G, belong to multiple services and thus are associated with multiple branches.

FIG. 4 further illustrates nine service segments 405, 410, 415, 420, 425, 430, 435, 440, 445 determined for the graph data structure. The service segments can be specified in terms of an ordered pair (X, Y) where X represents the set of source nodes and Y represents the destination node. Under this convention, the service segments can be specified as ($R_1$, A) 405, ($R_2$, D) 410, ($R_3$, E) 415, ($R_4$, F) 420, ($R_5$, I) 425, ({A,D}, B) 430, ({B,E}, C) 435, ({F,I}, G) 440, and ({G}, H) 445.

If additional services are added, the graph data structure and list of service segments may be updated accordingly. For example, if a service $S_6$: ($R_6$, D→E→H) were added, then the service segment ({G}, H) would be revised to ({G, E}, H), and two additional service segments ($R_6$, D) and (D,E) would be added.

Embodiments of the present invention include determining demands related to the service segments defined above. A service segment comprises a set of segment-specific source nodes and a segment-specific destination node. A segment-specific source node is a source node or a service node, belonging to a service segment, from which service packets flow into the service segment. A segment-specific destination node is a service node or a destination node, belonging to a service segment, to which service packets in the service segment flow. As such, segment-specific source and destination nodes behave as source and destination nodes when the service segment is viewed in isolation. A segment-specific source node need not be a source node of a service. When service segments are coupled together in sequence, a segment-specific source node of one service segment can be a segment-specific destination node of another service segment and vice-versa.

Determining the demand of a service segment corresponds to determining the demands for all segment-specific source nodes of the service segment. This can be performed through a recursive process as described below. Other, substantially equivalent calculations may be applied to determine the demands of service segments.

According to embodiments of the present invention, service segments demands are derived as follows. Where K is the number of identified service segments, each service segment is assigned an index value from 1 to K. For each service segment indexed from k=1 to k→K, $S^k$ represents the set of segment-specific source nodes of service segment k, and $q^k$ represents the segment-specific destination node of service segment k. Where, for a given pair of index values k and j, node $q^k$ belongs to $S^j$ (i.e. the segment-specific destination node of service segment k is a segment-specific source node for service segment j), a corresponding segment-specific demand is specified as:

$$d^j(q^k) = \sum_{n \in S^k} d^k(n). \quad (1)$$

A recursive process for determining the segment-specific demands is described as follows. First, service segments k are identified in which all nodes in $S^k$ are also source nodes of services. For nodes n in $S^k$, set $d^k(n)$ equal to an amount of demand specified for node n acting as a source node of the corresponding service.

Next, for the identified service segments k in which all nodes in $S^k$ are also source nodes of services, and for service segments j for which $q^k$ belongs to $S^j$, evaluate $d^j(q^k)$ according to Equation (1).

Next, repeat the following process until the demands of all service segments are known. Determine service segments k for which $d^k(n)$ is known for all nodes n in $S^k$ but for which $d^j(q^k)$ is not yet determined for service segments j for which $q^k$ belongs to $S^j$. For these service segments, evaluate $d^j(q^k)$ according to Equation (1) (where j is such that $q^k$ belongs to $S^j$). It is noted that a given segment-specific destination node $q^k$ may belong to multiple sets of segment-specific source nodes, associated with more than one service segment.

As an example, in terms of FIG. 3, the $d^k(n)$ values may be determined for source nodes in set 310. The $d^k(n)$ values may then be determined for service nodes 320 and 322. The $d^k(n)$ value may then be determined for service node 324, equal to the $d^k(n)$ value of service node 320. Finally, the $d^k(n)$ value may be determined for destination node 330, as a sum of $d^k(n)$ values of service nodes 322 and 324.

In some embodiments, an alternative method for determining demands of service segments can be used. The alternative method comprises measuring traffic data rates entering a segment-specific source node within a service segment, and using the measured traffic data rate as the appropriate $d^k(n)$ value.

Embodiments of the present invention relate to determining a set of flow group conservation constraints which specify how data is introduced at sources, flows through intermediate nodes, and reaches intended destinations. The flow group conservation constraints are expressed in terms of the service segments which are determined as described above, and in terms of the $d^k(n)$ values indicative of aggregate (cumulative) demands at the various source nodes and service nodes, as also described above. In other words, for a service segment k, $d^k(n)$ represents a combined or cumulative amount of demand. More particularly, this amount of demand represents the combined demand of source nodes belonging to particular services, out of the set of all services, for which service packets pass through the service segment k.

In various embodiments of the present invention, each physical node, including but not limited to service nodes, is associated with number of flow group conservation constraints substantially equal to the number of service segments associated with that physical node.

In the formulation below, $A_{in}(n)$ and $A_{out}(n)$ represent the set of links terminating at a network node n and the set of links originating at node n, respectively. As before, $S^k$ represents the set of segment-specific source nodes for a service segment k, and $q^k$ represents the segment-specific destination node for service segment k. The segment-specific source nodes and segment-specific destination node for a service segment are different than the source nodes and destination nodes for a service. The segment-specific destination node is the node of the service segment that receives the service traffic. The segment-specific source nodes for a service segment are the nodes of the service segment that provide the service traffic, for example as packets received from other nodes and forwarded on to the service segment.

For each node n including but not necessarily limited to source nodes, service nodes and destination nodes, and for each service segment k indexed from 1 to K, a flow group conservation constraint is defined as follows:

$$\sum_{a \in A_{in}(n)} x_a^k - \sum_{a \in A_{out}(n)} x_a^k = \begin{cases} 0, & n \notin S^k, n \neq q^k \\ -d^k(n), & n \in S^k \\ \sum_{m \in S^k} d^k(m), & n = q^k \end{cases}$$

The variables $x_a^k$ may be viewed as decision variables indicative of an amount of resource allocation for link a connected to node n for conveying data in support of service segment k.

For nodes which are neither segment-specific source node nor segment-specific destination nodes, the flow group conservation constraints reflect that the amount of resource allocation on links out of the node is equal to the amount of resource allocation on links into the node.

For nodes which are segment-specific destination nodes, the flow group conservation constraints reflect that the amount of resource allocation on links into the node is greater than the amount of resource allocation on links out of the node by a margin equal to the total incoming flow demand to the node, insofar as the flow demand relates to services for which the node is a segment-specific destination node.

For nodes which are segment-specific source nodes, the flow group conservation constraints reflect that the amount of resource allocation on links out of the node is greater than the amount of resource allocation on links into the node by a margin equal to the total demand of the node.

Embodiments of the present invention include determining an allocation of communication resources that respects a set of constraints, such as flow group conservation constraints and link capacity constraints. Other constraints, such as non-negativity constraints may also be explicitly added if required. The allocation may correspond to the amount of rate assigned and/or reserved by a supervisory traffic engineering controller on a given link for a given flow group or service.

Prior to determining the allocation of communication resources, the constraints are determined. In particular, the flow group conservation constraint may be determined for nodes and service segments in the communication network, as described above.

The link capacity constraints may be determined from received information about the communication network. For links a in the communication network, an associated maximum link capacity may be received as a predetermined quantity $c_a$, for example given in bits per second. The link capacity constraint is then formulated as:

$$\sum_{k=1}^{K} x_a^k \leq c_a,$$

where K is the number of service segments, and $x_a^k$ is the allocation on link a for service segment k.

As noted above, embodiments of the present invention comprise determining a resource allocation which satisfies the flow group conservation constraints and the link capacity constraints. The resource allocation may also maximize or approximately maximize a predetermined objective function U(x). Here, x is a vector consisting of entries $x_a^k$ over all links a and service segments k for which $x_a^k$ is defined as described above. The objective function may encode one or more given network objectives such as load balancing, sum rate maximization, and weighted sum rate maximization, as would be readily understood by a worker skilled in the art.

As such, determining the resource allocation may correspond to solving a constrained optimization problem. Depending on the form of the optimization problem, various solution techniques may be employed, such as linear programming solution techniques, branch and bound algorithms, heuristic methods based on problem structure, or the like. In some embodiments, the constrained optimization problem may be at least partially formulated as:

$$\max_{x} U(x)$$

subject to:

$$\sum_{a \in A_{in}(n)} x_a^k - \sum_{a \in A_{out}(n)} x_a^k = \begin{cases} 0, & n \notin S^k, n \neq q^k \\ -d^k(n), & n \in S^k \\ \sum_{m \in S^k} d^k(m), & n = q^k \end{cases}$$

for k=1 to K and
all nodes n of the network.

$$\sum_{k=1}^{K} x_a^k \leq c_a,$$

for all a for which $x_a^k$ is defined.

In some embodiments, the optimization problem may be solved jointly for all service segments. In some embodiments, the optimization problem may be solved in stages, each stage corresponding to a different service segment or set of service segments.

The solution x to the constrained optimization problem can be used as a basis for controlling resource allocations of network nodes, such as service nodes, in a manner which accommodates the services provided. Nodes can be informed of the resource allocations, which may correspond to bandwidth reservations, and the nodes can subsequently implement packet handling policies, including traffic forwarding and routing policies, that respect the resource allocations.

Various embodiments of the invention relate to a method of traffic forwarding in a multi-hop data network, in a manner supportive of services associated with Service Function Chains (SFCs). Accordingly, a data plane forwarding mechanism may be provided which causes service packets to be routed through a corresponding sequence of service nodes associated with a SFC.

In accordance with embodiments, packets are labeled with an indication of a service segment to be traversed, prior to traversal of same. Packets which are to sequentially traverse multiple service segments may be re-labeled once or several times. The number of re-labelings (following initial labeling) may equal the number of service nodes being visited prior to the destination node. Packet labeling and re-labeling may include configuring a field in the packet header, such as a destination address field. Packet labeling and re-labeling may occur at source nodes and at service nodes located at the boundaries between service segments. Packets labeled with an indication of a service segment are handled by routers and other network equipment in a manner that forwards the packets toward the "root" service node (or destination node) of that service segment. The root node is the node to which all service links of the service segment commonly lead.

Forwarding of a labeled packet may be performed similarly to destination-based routing operations. Destination-based traffic engineering is described for example in H. Abrahamsson et al. "A multi-path routing algorithm for IP networks based on flow optimization," International Workshop on Quality of Future Internet Services, Zurich, October 2002. In some embodiments of the present invention, destination-based routing may be performed based on the current packet label, and a sequence of destination-based routing operations may be applied to a packet based on the corresponding sequence of packet labels as re-labeling occurs.

In various embodiments, packet labeling/re-labelling information may be transmitted to various source nodes and/or service nodes for use in labeling and re-labeling of packets. The information may be transmitted via control plane messages, for example, and may correspond to a rule or set of rules, a lookup table, or other format.

In various embodiments, the new service segment identifier with which to re-label a packet is based solely on the existing service segment identifier carried by the packet. A packet re-labeling table may be provided to the service node with pairs of entries listing existing service segment identifiers and new segment identifiers. The service node, in receipt of a packet may look up the existing service segment identifier in the table and replace it with the corresponding new service segment identifier. In other embodiments, the packet may carry with it an identifier of the service to which it belongs. In this case, packet service segment identifier labeling and/or re-labeling may be based on the service identifier rather than the current service segment identifier. For example, service nodes may hold a table which relates service identifiers to the corresponding service segment identifiers to be used next.

Network nodes, including but not limited to service nodes, may implement packet routing using a routing table which is based on service segment identifiers. Correspondence between service segment identifiers of packets and an outgoing link on which to forward the packets may be encoded within the routing tables. At service nodes, packet re-labeling information may be integrated with the routing table.

Figure 5:
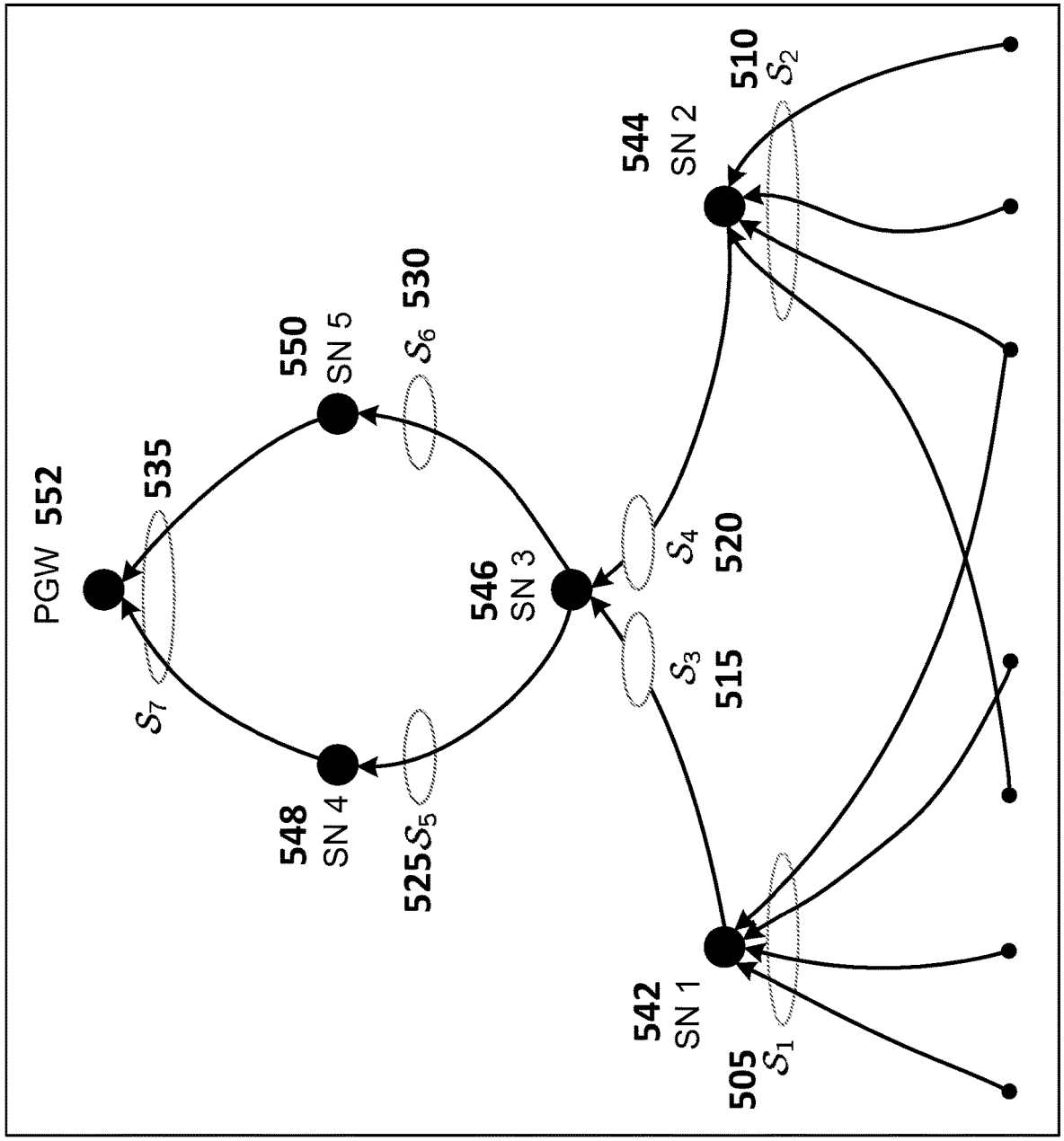
FIG. 5 illustrates an example network configuration in accordance with another embodiment of the present invention.

When each service node is associated with exactly one outgoing service link, service segment identifiers used for routing purposes may correspond directly to the service segment identifiers used for traffic engineering purposes. However, when one or more service nodes are associated with multiple outgoing service links, a finer-grained set of service segment identifiers used for routing purposes may be required. FIG. 5 illustrates a motivating example, in which Service Node SN3 546 supports two services outgoing on two different service links corresponding to two different service segments 525, 530. The services are defined as $S_1$: ($R_1$, SN1→SN3→SN4→PGW), and $S_2$: ($R_2$, SN2→SN3→SN5→PGW). If both incoming service links to SN3 546 were associated with a single service segment identifier, and service nodes were configured to perform label switching based solely on the current service segment identifier, then SN3 546 would be unable to differentiate between the two services and forward packets onto the appropriate outgoing service link. One solution in this particular case is to associate each of the incoming links to SN3 546 with a different service segment identifier.

In more detail, FIG. 5 illustrates a first service segment $S_1$ 505 incoming to a first service node SN1 542, a second service segment $S_2$ 510 incoming to a second service node SN2 544, third and fourth service segments $S_3$ 515 and $S_4$ 520 incoming to a third service node SN3 546, a fifth service segment $S_5$ 525 incoming to a fourth service node SN4 548, a sixth service segment $S_6$ 530 incoming to a fifth service node SN5 550, and a seventh service segment $S_7$ 535 incoming to a destination node PGW 552.

More generally, when two SFCs coincide at one or more nodes, but diverge subsequently to the coinciding nodes, then a separate service segment may be defined for each SFC, to facilitate routing based solely on service segment identifiers. When the two SFCs share a service link, the shared service link may be associated with two service segmenets. This principle can be readily extended to multiple SFCs.

For example, consider two services, $S_1$: ($R_1$, SN1→SN3→SN4→PGW) and $S_2$: ($R_2$, SN1→SN3→SN5→PGW). If SN3 is required to differentiate between $S_1$ and $S_2$ based on service segment identifier, then two separate service segments between SN1 and SN3 can be defined, and packets belonging to $S_1$ may traverse one of the service segments while packets belonging to $S_2$ traverse the other. It is noted that the two logical service segments may share the same underlying physical resources. Similarly, the service segment between $R_1$ and SN1 should be different than the service segment between $R_2$ and SN1. This may be automatic if $R_1$ and $R_2$ are disjoint, but the definition of service segments may require additional handling rules if $R_1$ and $R_2$ overlap or coincide.

Embodiments of the present invention comprise controlling operation of the data network in accordance with the determined resource allocation. Controlling operation of the data network may include providing instructions to various network elements such as routers and service nodes, the instructions directing the network elements to implement the determined resource allocations. The instructions may additionally or alternatively direct the network elements to route packets according to the resource allocation. The instructions may direct the network elements to route packets in a manner that causes packets belonging to given services to traverse a path corresponding to the SFC of that service. In some embodiments, controlling operation of the data network may further include routing packets according to the resource allocation. As such, while some embodiments of the present invention relate to traffic engineering control of the data network, other embodiments may relate to both control of the data network and execution of data network operations, such as packet routing, in accordance with such traffic engineering control.

Figure 6:
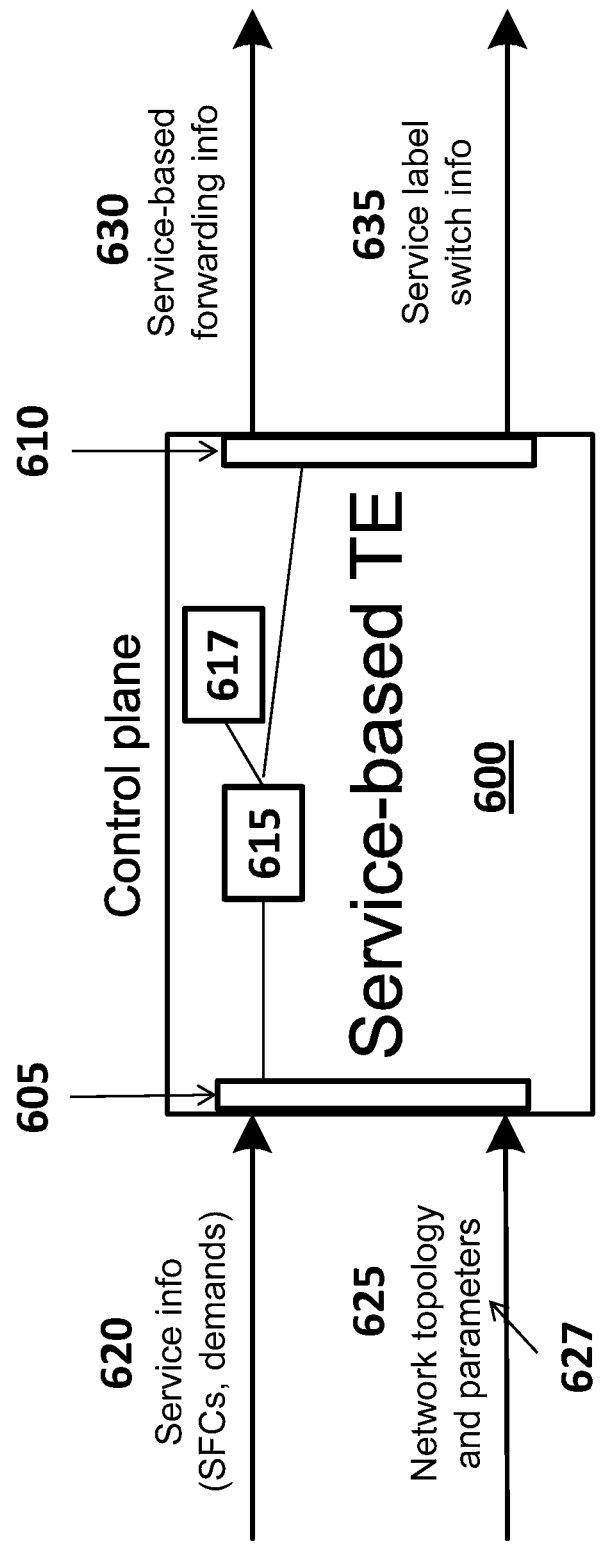
FIG. 6 illustrates a traffic engineering controller in accordance with embodiments of the present invention.

Embodiments of the present invention may include a service-based traffic engineering controller located in a communication network control plane. FIG. 6 illustrates a traffic engineering controller 600 configured to receive service information 620, such as definitions of services, service function chains, and demand levels of source nodes associated with the services. The traffic engineering controller is further configured to receive network topology information 625 and network parameter information 627. Network topology information may be descriptive of the locations of nodes in the network and data links therebetween. Network parameter information may include capacities for the data links. The traffic engineering controller is configured to determine a resource allocation which supports the services, for example by solving the constrained optimization problem as described above.

The traffic engineering controller is further configured to provide service-based forwarding information 630 and service-based label switching information 635. Service-based forwarding information may be determined, by the traffic engineering controller, based on the resource allocation determined for the data network. The resource allocation may be determined by solving the constrained optimization problem for x as described above. For example, suppose the resource allocation solution x includes particular non-zero values $x_a^k$ for a given service segment k and set of associated outgoing physical links a=1, 2, . . . . The service-based forwarding information may then specify that, when packets with service segment identifier k arrive at node n, they are forwarded onto each outgoing physical link a with a traffic volume proportional to $P(a)=x_a^k/\Sigma_a x_a^k$. For example, each service packet at node n can be forwarded onto link a with probability P(a).

Service-based label switching information may be determined, by the traffic engineering controller, based on the identification of service segments. For example, service nodes located at the boundaries of service segments may be identified and provided with label-switching information. The label-switching information may indicate a rule, such as: IF incoming packet is labeled with service segment identifier $m_1$, THEN change the label of the packet to service segment identifier $m_2$, where $m_1$ and $m_2$ are specified by the rule. While label switching may occur at service nodes, label switching may not occur at other nodes, such as intermediate routers internal to a service link.

The traffic engineering controller includes an input network interface 605 configured to receive information such as the service information, network topology information and network parameter information. The input network interface may be connected to other networked devices or functions which act as sources for such information. The traffic engineering controller further includes an output network interface 610 configured to transmit signals for controlling operation of the data network in accordance with the determined resource allocation. The control signals may include information such as the service-based forwarding information and the service-based label switching information. The output network interface may be connected via the communication network control plane to various other network devices such as routers, service nodes, service-based forwarding controller, and the like, which use this information to perform packet handling operations. The traffic engineering controller further includes a processor 615 operatively coupled to memory 617, the processor configured to execute program instructions stored in the memory in order to determine a desired resource allocation based on the service information, network topology information and network parameter information, as well as determining the service-based forwarding information and the service-based label switching information. The processor may be a microprocessor or collection of microprocessors configured to execute program instructions stored in memory, or another electronic processing device such as a microcontroller, application-specific integrated circuit, or other processing hardware. In some embodiments, as the operations of the processor are computationally intensive and repeatedly performed, a relatively powerful processing facility such as a set of parallel processors may be utilized.

The traffic engineering controller may include a networked computing device, a collection of computing devices, or a virtualized computing device. Virtualized computing devices may be hosted by general-purpose computing hardware in one or more locations.

Embodiments of the present invention include one or more routers which are configured to operate as described herein to inspect, handle and potentially modify received packets.

Figure 7:
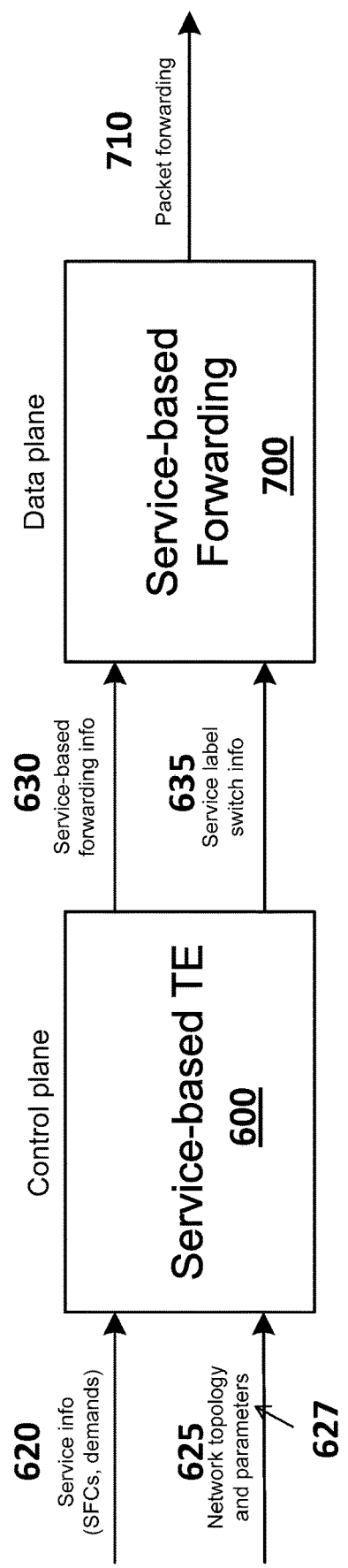
FIG. 7 illustrates a traffic engineering controller operatively coupled to a service-based forwarding function, in accordance with an embodiment of the present invention.

FIG. 7 illustrates a traffic engineering controller 600 operatively coupled to a service-based forwarding function 700 residing in a data plane, in accordance with an embodiment of the present invention. The service-based forwarding function 700 may be implemented at a plurality of routers or other network nodes, in a distributed manner, for example. The service-based forwarding function 700 may also be implemented by networked computing device, a collection of networked computing devices, or a virtualized computing device. In some embodiments, the service-based forwarding function 700 may be implemented by one or a plurality of network routers, nodes, source nodes, or service nodes.

The service-based forwarding function 700 is configured to receive the service-based forwarding information 630 and the service-based label switching information 635 from the traffic engineering controller. The information may be conveyed via control messages through the data network. The service-based forwarding function 700 is further configured to implement packet forwarding 710 in the data network in compliance with the service-based forwarding information 630 and the service-based label switching information 635.

For example, the service-based forwarding function may be configured to handle packets in accordance with resource allocations specified in the service-based forwarding information provided by the traffic engineering controller. The service-based forwarding function may further be configured to perform routing and packet labeling and re-labeling according to service-based label switching information provided by the traffic engineering controller.

Figure 8:
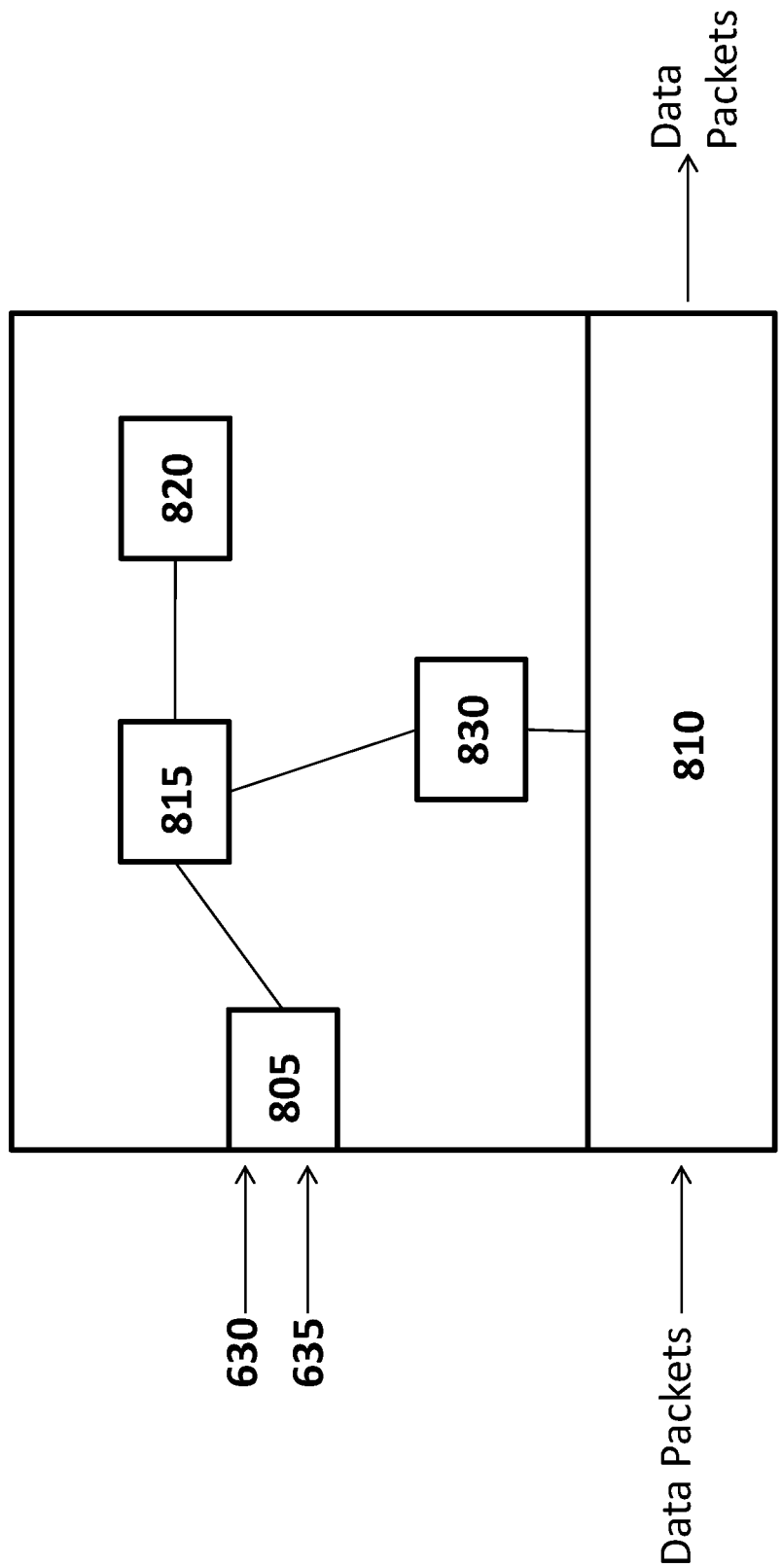
FIG. 8 illustrates a router configured to implement service-based forwarding, in accordance with embodiments of the present invention.

FIG. 8 illustrates a router configured to implement at least part of the service-based forwarding function, in accordance with embodiments of the present invention. The service-based router includes an input network interface 805 configured to receive information such as the service-based forwarding information 630 and the service-based label switching information 635. The router further includes data packet handling interface 810 configured to receive, handle and forward data packets in accordance with the service-based forwarding information and the service-based label switching information. The data packet handling interface 810 may be configured to receive and transmit data packets to and from the network on several selectable links. The data packet handling interface 810 may be associated with a routing table 830 configured to control routing of data packets. The router further includes a processor 815 operatively coupled to memory 820, the processor configured to execute program instructions stored in the memory in order to implement packet handling functions in accordance with the present invention, for example by updating the routing table 830. Alternatively, the processor and memory may be replaced with other processing components, such as dedicated logic components, firmware, or integrated circuits.

FIGS. 9A to 9C illustrate a sequence of operations being performed in accordance with embodiments of the present invention. As illustrated, the sequence of operations includes identifying 905 service segments for a portion of the communication network. The identification is based on information regarding a set of services to be supported. The identification 905 of service segments includes identifying 910 SFCs of all services to be supported. The SFCs may be explicitly or implicitly defined by the services. In the present embodiment, the identification of service segments further includes forming 915 a graph data structure according to the identified SFCs. The graph data structure encodes the topology of services being supported, for example as a tree graph, as discussed above. The identification of service segments further includes identifying 920 service segments, based on the graph data structure, as collections of nodes in the graph data structure, as also discussed above.

As further illustrated, the sequence of operations includes determining 930 demands for the identified service segments. The demands for service segments can be determined separately 935 for each service segment and for each node n of the graph data structure. The demand $d^k(n)$ for service segment k and node n can be determined using Equation (1) as described above.

As further illustrated, the sequence of operations includes determining 940 flow group conservation constraints for each service segment k and each node n. The flow group conservation constraints are expressed based on the demands $d^k(n)$ and are also discussed above.

As further illustrated, the sequence of operations includes determining 960 a feasible and/or optimal traffic allocation subject to the determined conservation constraints along with link capacity constraints. This may include computing a solution to an optimization problem as illustrated, and also as described above.

In some embodiments, the network nodes may further be configured to provide information to the traffic engineering controller, the service-based forwarding function, or both. The information may be indicative of performance feedback, network topology, data traffic conditions, and may be used to adjust operation of the traffic engineering controller and/or service-based forwarding controller.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

In some embodiments the traffic engineering controller, aspects of the service-based forwarding function and/or service nodes can be configured with sufficient functionality to enable instantiation of their respective functionality on an as-needed basis according to current processing requirements. These may, for example, be realized as virtual network functions (VNFs) within a Network Function Virtualization (NFV) framework. For example, a VNF corresponds to a function enabling operation of a communication network. For example a VNF can provide the functions of a router, switch, gateway, firewall, load balancer, server, mobility management entity, and the like. The function is virtualized in the sense that it may utilize a set of virtual resources, such as computing, storage and networking resources, rather than utilizing dedicated hardware resources. As such, VNF may be instantiated on an as-needed basis using available virtual resources. NFV and virtual network functions architecture is described in ETSI GS NFV-SWA 001, for example.

In some embodiments the traffic engineering controller, aspects of the service-based forwarding function and/or service nodes may comprise software defined networking (SDN) components, or programs deployed on the same or differing device platforms of the communication network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via software defined toplogy (SDT). The SDT can be combined with the SDN and software defined protocol (SDP) to create a customized virtual network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A router for routing a service packet in a multi-hop data network, the service packet belonging to a service and including an identifier of a first service segment traversed by the packet, the service corresponding to a set of service nodes through which the service packet is required to pass, the set of service nodes corresponding to a service function chain for the service, the router communicatively coupled to one of the set of service nodes and comprising:
a data packet handling interface configured to:
receive the service packet;
process the service packet to;
determine a destination service node of the set of service nodes to transmit the service packet to according to only the identifier of the first service segment and service-based forwarding information specifying resource allocation for the multi-hop data network;
re-label the service packet to include an identifier of a second service segment to be traversed by the packet upon transmission of the service packet from the router; and
transmit the service packet toward the destination service node of the set of service nodes;
a service-based forwarding function configured to:
receive the service-based forwarding information and service-based label switching information from a traffic engineering controller and re-label the service packet to include the identifier of a second service segment to be traversed by the service packet upon transmission of the service packet from the router.

2. The router of claim 1, wherein transmitting the service packet toward the destination service node comprises transmitting the service packet to an intermediate router located between the router and a next service node.

3. The router of claim 1, further comprising a network interface configured to transmit the identifier of the first service segment to the traffic engineering controller and receive the identifier of the second service segment from the traffic engineering controller.

4. The router of claim 1, wherein the data packet handing interface is further configured to determine the identifier of the second service segment according to the first service segment identifier and service-based label switching information received from the traffic engineering controller via a network interface of the router.

5. The router of claim 1, further comprising network interface configured to receive service-based forwarding information from the traffic engineering controller.

6. The router of claim 1, wherein the data packet handing interface is further configured to determine the second service identifier according to the first service segment identifier and service-based label switching information stored in the router.

7. The router of claim 1, wherein data packet handling interface is configured to re-label the service packet to include an identifier of a second service segment to be traversed by the service packet upon transmission of the service packet from the router by configuring a destination address field in a packet header of the service packet.

8. A method performed by a router for routing a service packet in a multi-hop data network comprising a set of service nodes, the service packet belonging to a service corresponding to the set of service nodes through which the service packet is required to pass, the set of service nodes corresponding to a service function chain for the service, the method comprising:
receiving the service packet including a first service segment identifier indicative of a first service segment traversed by the service packet;
processing the service packet to:
determine a destination service node of the set of service nodes to transmit the service packet to according to only service-based forwarding information specifying resource allocation for the multi-hop data network and the first service segment identifier;
re-label the service packet to include a second service segment identifier determined according to the first service segment identifier and service-based label switching information, the second service segment identifier indicative of a second service segment to be traversed by the service packet upon transmission of the service packet from the router; and
transmitting the service packet toward the destination service node of the set of service nodes;
receiving the service-based forwarding information and the service-based label switching information from a traffic engineering controller and re-label the service packet to include the identifier of a second service segment to be traversed by the service packet upon transmission of the service packet from the router.

9. The method of claim 8, wherein transmitting the service packet toward the destination service node comprises transmitting the service packet to an intermediate router located between the router and a next service node.

10. The method of claim 8, further transmitting the first service identifier to the traffic engineering controller and receive the second service identifier determined by the traffic engineering controller.

11. The method of claim 8, wherein the second service identifier based on the first service identifier, according to service-based label switching information received from the traffic engineering controller via a network interface of the router.

12. The method of claim 8, further comprising receiving, via a network interface of the router, the service-based forwarding information from the traffic engineering controller.

13. The method of claim 8, further comprising processing the service packet to determine the second service identifier according to the first service segment identifier and service-based label switching information.

14. The method of claim 8, wherein processing the service packet to re-label the service packet to include an identifier of a second service segment to be traversed by the service packet upon transmission of the service packet from the router comprises configuring a destination address field in a packet header of the service packet.

15. A non-transitory computer-readable medium storing instructions which, when executed by a processor of a router cause the router to route a service packet in a multi-hop data network comprising a set of service nodes by:
receiving the service packet including a first service segment identifier indicative of a first service segment traversed by the service packet;
processing the service packet to:
determine a destination service node of the set of service nodes to transmit the service packet to according to only service-based forwarding information specifying resource allocation for the multi-hop data network and the first service segment identifier, the service packet belonging to a service corresponding to the set of service nodes through which the service packet is required to pass, the set of service nodes corresponding to a service function chain for the service;

re-label the service packet to include a second service segment identifier determined according to the first service segment identifier and service-based label switching information, the second service segment identifier indicative of a second service segment to be traversed by the service packet upon transmission of the service packet from the router; and transmitting the service packet toward the destination service node of the set of service nodes;

receiving the service-based forwarding information and the service-based label switching information from a traffic engineering controller and re-label the service packet to include the identifier of a second service segment to be traversed by the service packet upon transmission of the service packet from the router.

16. The non-transitory computer-readable medium of claim 15, wherein transmitting the service packet toward the destination service node comprises transmitting the service packet to an intermediate router located between the router and a next service node.

17. The non-transitory computer-readable medium of claim 15, further transmitting the first service identifier to the traffic engineering controller and receive the second service identifier determined by the traffic engineering controller.

18. The non-transitory computer-readable medium of claim 15, wherein the second service identifier based on the first service identifier, according to service-based label switching information received from the traffic engineering controller via a network interface of the router.

19. The non-transitory computer-readable medium of claim 15, further comprising receiving, via a network interface of the router, the service-based forwarding information from the traffic engineering controller.

* * * * *